(12) United States Patent
Sawamura et al.

(10) Patent No.: US 9,333,457 B2
(45) Date of Patent: May 10, 2016

(54) ZEOLITE MEMBRANE SEPARATION AND RECOVERY SYSTEM FOR CO₂

(75) Inventors: Ken-ichi Sawamura, Osaka (JP); Masanobu Aizawa, Osaka (JP); Takehiro Shimizu, Osaka (JP)

(73) Assignees: Hitachi Zosen Corporation, Osaka-shi (JP); JX Nippon Oil & Energy Corporation, Chiyoda-ku (JP)

(*) Notice: Subject to any disclaimer, the term of this patent is extended or adjusted under 35 U.S.C. 154(b) by 31 days.

(21) Appl. No.: 14/116,347

(22) PCT Filed: May 9, 2012

(86) PCT No.: PCT/JP2012/061874
§ 371 (c)(1),
(2), (4) Date: Jan. 24, 2014

(87) PCT Pub. No.: WO2012/153763
PCT Pub. Date: Nov. 15, 2012

(65) Prior Publication Data
US 2014/0174290 A1 Jun. 26, 2014

(30) Foreign Application Priority Data
May 9, 2011 (JP) ................................. 2011-104382

(51) Int. Cl.
*B01D 53/22* (2006.01)
*B01D 71/02* (2006.01)
(Continued)

(52) U.S. Cl.
CPC .............. *B01D 53/22* (2013.01); *B01D 53/228* (2013.01); *B01D 53/268* (2013.01); *B01D 53/62* (2013.01);
(Continued)

(58) Field of Classification Search
CPC .... B01D 53/22; B01D 53/226; B01D 53/228; B01D 53/268; B01D 53/62; B01D 67/0088; B01D 71/028; B01D 2323/08; B01D 2256/16; B01D 2256/22; B01D 2257/108; B01D 2257/504; C01B 3/503; C01B 2203/0405; C01B 2203/0475; Y02C 10/04; Y02C 10/10
USPC ................................. 95/45, 51, 52; 96/4, 7, 9
See application file for complete search history.

(56) References Cited

U.S. PATENT DOCUMENTS 5,002,590 A * 3/1991 Friesen et al. ..................... 95/52
8,221,524 B2 * 7/2012 Mitariten ........................... 95/51
(Continued)

FOREIGN PATENT DOCUMENTS

JP   10-036114 A   2/1998
JP   2001-259417 A   9/2001
(Continued)

OTHER PUBLICATIONS

Li, Shiguang et al., "Effects of impurities on CO2/CH4 separations through SAPO-34 membranes", Journal of Membrane Science, Dec. 2004, 251, pp. 59-66.*
(Continued)

*Primary Examiner* — Jason M Greene
(74) *Attorney, Agent, or Firm* — Locke Lord LLP; James E. Armstrong, IV; Nicholas J. DiCeglie, Jr.

(57) ABSTRACT

To provide a CO₂ membrane separation and recovery system that is excellent in CO₂ permeability and CO₂ separation selectivity on recovery of CO₂ in a hydrogen production process and the like. The CO₂ membrane separation and recovery system of the present invention comprises a dehydration treatment module (2) preliminary to a CO₂ membrane separation module (1), the CO₂ membrane separation module (1) comprises a hydrophilic zeolite membrane (3) that exhibits CO₂ selective permeability and is formed on a porous substrate, and the hydrophilic zeolite membrane (3) is subjected to a dehydration treatment by a heat treatment at from 100 to 800° C.

18 Claims, 2 Drawing Sheets

(51) Int. Cl.

| | | |
|---|---|---|
| *C01B 3/50* | (2006.01) | |
| *B01D 53/26* | (2006.01) | |
| *B01D 53/62* | (2006.01) | |
| *B01D 67/00* | (2006.01) | |

(52) U.S. Cl.
CPC .......... *B01D 67/0088* (2013.01); *B01D 71/028* (2013.01); *C01B 3/503* (2013.01); *B01D 2253/108* (2013.01); *B01D 2256/16* (2013.01); *B01D 2256/22* (2013.01); *B01D 2257/504* (2013.01); *B01D 2323/08* (2013.01); *C01B 2203/0405* (2013.01); *C01B 2203/0475* (2013.01); *Y02C 10/04* (2013.01); *Y02C 10/10* (2013.01)

(56) References Cited

U.S. PATENT DOCUMENTS

| | | | |
|---|---|---|---|
| 8,535,638 B2 * | 9/2013 | Terrien et al. | 423/650 |
| 2004/0056343 A1 | 3/2004 | Casci | |
| 2004/0099138 A1 * | 5/2004 | Karode et al. | 95/51 |
| 2005/0204916 A1 * | 9/2005 | Falconer et al. | 95/51 |
| 2007/0240565 A1 * | 10/2007 | Doong et al. | 95/45 |
| 2010/0129284 A1 * | 5/2010 | Niitsuma et al. | 423/437.1 |
| 2010/0260657 A1 * | 10/2010 | Niitsuma et al. | 423/437.1 |
| 2012/0111051 A1 * | 5/2012 | Kulkarni et al. | 62/619 |
| 2012/0118011 A1 * | 5/2012 | Terrien et al. | 62/619 |

FOREIGN PATENT DOCUMENTS

| | | | | |
|---|---|---|---|---|
| JP | 2004-532093 A | | 10/2004 | |
| JP | 2006-176399 A | | 7/2006 | |
| JP | 2006-239663 A | | 9/2006 | |
| JP | 2007-125543 A | | 5/2007 | |
| JP | 2007-313389 A | | 12/2007 | |
| JP | 2008-036463 A | | 2/2008 | |
| JP | 2009-11980 | * | 1/2009 | ............ B01D 71/02 |
| JP | 2009-011980 A | | 1/2009 | |
| JP | 2009-029675 A | | 2/2009 | |
| JP | 4264194 B2 | | 5/2009 | |
| JP | 2010-254544 | * | 11/2010 | ............ B01D 53/22 |
| JP | 2010-254544 A | | 11/2010 | |
| JP | 2012-055501 A | | 3/2012 | |
| WO | WO-99/06138 A1 | | 2/1999 | |

OTHER PUBLICATIONS

International Search Report dated Jun. 19, 2012, issued for PCT/JP2012/061874.
Notice of Reasons for Rejection dated Jun. 30, 2015, issued for Japanese Patent Application No. 104382/11.
Sato, K. et al., "CO2 separation over FAU type zeolite membrane," The Japan Petroleum Institute, Jan. 25, 2011, Session ID: 2D21.
Li, S., et al., "Effects of impurities on CO2/CH4 separations through SAPO-34 membranes," Journal of Membrane Science, Elsevier, Dec. 23, 2004, 251, pp. 59-66.
Welk, ME. et al., "H2 Separation through zeolite thin film membranes," Preprints of Papers-American Chemical Society, Division of Fuel Chemistry, U.S.A., American Chemical Society, 2004, 49-2, pp. 889-890.

* cited by examiner

ZEOLITE MEMBRANE SEPARATION AND RECOVERY SYSTEM FOR CO₂

TECHNICAL FIELD

The present invention relates to a membrane separation system that recovers $CO_2$ with high efficiency on separation and recovery of $CO_2$ in a hydrogen production process and the like.

BACKGROUND ART

In a hydrogen production process that is currently employed, industrially, a hydrocarbon or the like is reformed through steam reforming or partial oxidation to a gas containing hydrogen and carbon monoxide as major components, and then carbon monoxide is reacted with steam according to the following chemical reaction formula, thereby producing hydrogens.

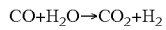

$$CO+H_2O \rightarrow CO_2+H_2$$

The gas thus produced contains a large amount of $CO_2$ along with hydrogen, and $CO_2$ is necessarily removed and recovered for industrial utilization of hydrogen.

As a removing and recovering technique of $CO_2$, a chemical absorption method, such as an amine absorption method, a physical adsorption method, such as PSA (pressure swing adsorption), and the like are currently employed. However, these $CO_2$ removing and recovering techniques consume a large amount of energy for a regeneration process of the absorbent or the adsorbent, and the cost therefor occupies a half or more of the cost for separation of $CO_2$.

In contrast, membrane separation may be operated continuously and does not require a regeneration process of the absorbent or the adsorbent, and therefore membrane separation is expected as an energy saving process.

Patent Literatures 1 and 2 describe the use of an organic polymer membrane functioning under a wet condition as a $CO_2$ facilitated transport membrane.

FIG. 5 is a flow chart showing a hydrogen production Process by separating and recovering $CO_2$ by utilizing membrane separation with the organic polymer membrane described in Patent Literatures 1 and 2.

A hydrocarbon or an alcohol as a raw material is reformed in a steam reformer (10) to form $H_2$, $CO_2$, CO, $CH_4$ (small amount) and $H_2O$, which are then introduced to a water gas shift reactor (11), in which CO in the gas is shifted to $CO_2$, thereby decreasing the amount of CO in the gas. The gas thus formed is fed to a separation module (12), in which $CO_2$ is separated and recovered with an organic polymer membrane (13), thereby resulting in an $H_2$ concentrated gas.

As described above, $CO_2$ may be recovered highly selectively by using an organic polymer membrane as a separation membrane with a $CO_2/H_2$ separation selectivity of 10 or more.

On the other hand, the separation membrane has a small $CO_2$ permeability of approximately $2\times10^{-7}$ (mol/(m²·s·Pa)) at most, but in consideration of application to a large-scale hydrogen production plant, the $CO_2$ permeability is desirably $5\times10^{-7}$ (mol/(m²·s·Pa)) or more, and the $CO_2/H_2$ separation selectivity is desirably 10 or more.

Nonpatent Literature 1 reports results of $CO_2/H_2$ separation using a hydrophobic zeolite membrane, in which hydrogen having a small molecular size preferentially permeates under a dry condition, and under a wet condition, $CO_2$ permeates with slight priority, but the $CO_2/H_2$ separation selectivity is as small as from 2.9 to 6.2.

Patent Literature 1: JP-A-2008-36463
Patent Literature 2: Japanese Patent No. 4,264,194
Nonpatent Literature 1: Journal. of Membrane Science (2010), vol. 360, pp. 284-291

DISCLOSURE OF INVENTION

Technical Problem

The present invention has been made in view of the circumstances described above, and an object thereof is to provide a $CO_2$ membrane separation and recovery system that is excellent in $CO_2$ permeability and $CO_2$ separation selectivity on recovery of $CO_2$ in a hydrogen production process and the like.

Solution to Problem

For solving the problem described above, the $CO_2$ membrane separation and recovery system. of the present invention comprises a dehydration means preliminary to a $CO_2$ membrane separation means, the $CO_2$ membrane separation means comprises a hydrophilic zeolite membrane that exhibits $CO_2$ selective permeability and is formed on a porous substrate, and the hydrophilic zeolite membrane is subjected to a dehydration treatment by a heat treatment at from 100 to 800° C., and preferably from 150 to 400° C.

Even in the case where the size of the molecule is smaller than the pore diameter of zeolite, $CO_2$ may be selectively separated through permeation by controlling the affinity between the zeolite and the molecule $CO_2$ has a larger polarity as compared to such kinds of gas as hydrogen and methane ($CH_4$), and thus has large affinity based on the electrostatic interaction with the cation in the zeolite.

Accordingly, the hydrophilic zeolite membrane is not particularly limited as far as it contains a large amount of cation sites functioning as selective adsorption sites for $CO_2$, such as $Li^+$, $Na^+$, $K^+$, $Ag^+$, $H_4^+$, $Ca^{2+}$, $Sr^{2+}$, $Ba^{2+}$, $Cu^{2+}$ and $Zn^{2+}$, and preferred examples of the hydrophilic zeolite include an FAU-type and a CHA-type from the standpoint of the permeability and separation selectivity of $CO_2$ and the durability of the membrane.

It is preferred that a noble metal membrane or a porous molecular sieve membrane constituted by silica or zeolite having an effective pore diameter of from 0.28 to 0.33 nm that allows hydrogen to permeate selectively is provided subsequent to the dehydration means.

The "effective pore diameter" of the porous molecular sieve membrane is generally evaluated by a single component membrane permeation test with hydrogen (0 .28 to 0.29 nm), water (0.30 nm), $CO_2$ (0.33 nm), methane (0.8) and the like. For example, a membrane that allows hydrogen and water to permeate but does not allow $CO_2$ and methane to permeate is evaluated to have an effective pore diameter that is larger than hydrogen, i.e., 0.28 nm or more, and is smaller than $CO_2$, i.e., less than 0.33 nm.

Examples of the metal membrane that allows hydrogen to permeate selectively include a Pd membrane.

The present invention also relates to a membrane separation and recovery method for $CO_2$ using the $CO_2$ membrane separation and recovery system described above, comprising a dehydration step preliminary to a $CO_2$ membrane separation step, the $CO_2$ membrane separation step being maintained to a dry condition having a dew point of a feed gas of from −80 to 0° C.

According to the method of the present invention, it is preferred that $CO_2$ is separated and recovered in a process of producing hydrogen from a hydrocarbon or an alcohol.

The method preferably comprises, subsequent to the dehydration step, a step of performing hydrogen purification with a noble metal membrane or a porous molecular sieve membrane constituted by silica or zeolite having an effective pore diameter of from 0.28 to 0.33 nm that allows hydrogen to permeate selectively.

According to the method of the present invention, $CO_2$ may e separated and recovered from a mixed gas containing $CO_2$.

It is preferred that the mixed gas is a natural gas or a biogas that contains methane gas as a major component and steam.

Advantageous Effects of Invention

The present invention comprises a dehydration means preliminary to a $CO_2$ membrane separation means, the $CO_2$ membrane separation means comprises a hydrophilic zeolite membrane that exhibits $CO_2$ selective permeability and is formed on a porous substrate, and the hydrophilic zeolite membrane is subjected to a dehydration treatment by a heat treatment at from 100 to 800° C., and preferably from 150 to 400° C. Accordingly, such a $CO_2$ membrane separation and recovery system may be provided that is excellent in $CO_2$ permeability and $CO_2$ separation selectivity on recovery of $CO_2$ in a hydrogen production process and the like.

DESCRIPTION OF EMBODIMENTS

The $CO_2$ membrane separation and recovery system according to the present invention will be described in detail below.

Figure 1:
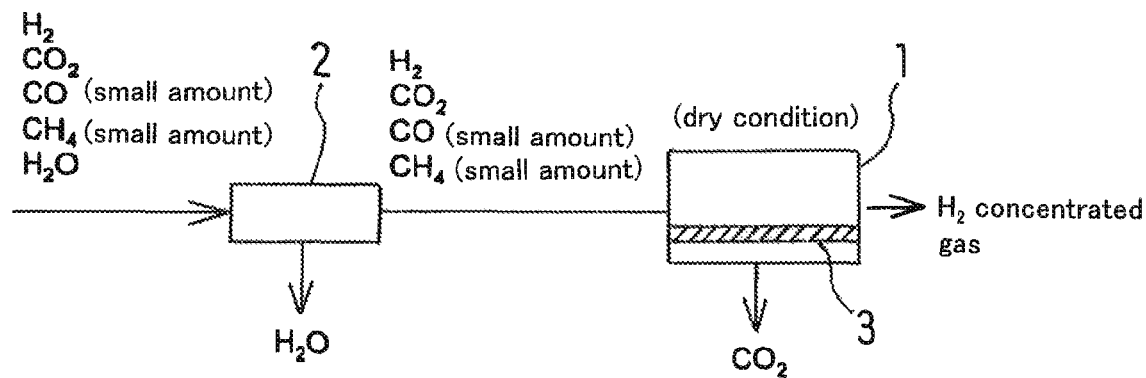
[FIG. 1]
The figure is a flow chart showing a $CO_2$ membrane separation and recovery system according to the present invention.

FIG. 1 is a flow chart showing a $CO_2$ membrane separation and recovery system according to the present invention.

The $CO_2$ membrane separation and recovery system of the present invention comprises a dehydration treatment module (2) preliminary to a $CO_2$ membrane separation module (1).

The $CO_2$ membrane module (1) has a hydrophilic zeolite membrane (3) that exhibits $CO_2$ selective permeability and is formed on a porous substrate. Examples of the porous substrate include porous materials of alumina, silica, cordierite, zirconia, titania, vycor glass and a sintered metal, but the substrate is not limited thereto, and various porous materials may be used.

The $CO_2$ membrane separation step in the $CO_2$ membrane module (1) is performed under the condition where the dew point is from −80 to 0° C., and preferably maintained to −20° C. or less.

As described above, the hydrophilic zeolite membrane (3) formed on the porous substrate is used as the $CO_2$ permeation separating membrane, rather than an organic polymer material. The hydrophilic zeolite membrane is necessarily maintained in such a condition that adsorbed water inside the pores of the zeolite is removed, for example, by heating to from 100 to 800° C., and preferably from 150 to 400° C. Preferred examples of the zeolite species constituting the hydrophilic zeolite membrane include FAU-type zeolite and CHA-type zeolite, which exhibit $CO_2$ selective adsorbability in a $CO_2$—$H_2$ mixed gas system.

The dehydration treatment module (2) may be any one that removes water to provide the dew point in the feed gas of from −80 to 0° C., and preferably −20° C. or less, by any method, and for example, the dehydration may be performed with a membrane air dryer using a polymer hollow fiber membrane or commercially available LTA-type zeolite membrane (NaA-type zeolite membrane, produced by Hitachi Zosen Corporation). The membrane removes water through selective permeation, thereby making the $CO_2$ membrane separation step as the subsequent step in a dry condition. On the permeation side of the dehydration membrane, water may be continuously removed by sweeping with the dry gas in the subsequent step that is partially used through circulation or by vacuuming.

In the case where high purity hydrogen is to be necessarily produced, a noble metal membrane or a porous molecular sieve membrane constituted by silica or zeolite having an effective pore diameter of from 0.28 to 0.33 nm that allows hydrogen to permeate selectively (which is not shown in the figure) may be provided subsequent to the dehydration means. According to the constitution, hydrogen may be purified without influence of deterioration of the membrane due to steam or the like.

As to whether the hydrogen purification is performed preliminary or subsequent to the $CO_2$ membrane separation, it may be determined depending on the demanded concentrations of hydrogen and $CO_2$ to be recovered. For example, in the case where enrichment of the permeated $CO_2$ concentration recovered in the $CO_2$ membrane separation step is to be given priority, the hydrogen purification step is advantageously performed preliminary to the $CO_2$ membrane separation step, thereby increasing the $CO_2$ concentration of the gas fed to the $CO_2$ membrane separation step. Conversely, in the case where enrichment of the permeated hydrogen concentration recovered is to be given priority, the hydrogen purification step is advantageously performed subsequent to the $CO_2$ membrane separation step.

The $CO_2$ separation and recovery process using a zeolite membrane of the present invention may be applied to separation and recovery of $CO_2$ from a natural gas or a biogas that contains methane as a major component.

The advantageous effect provided by the present invention will be described with reference to examples below.

EXAMPLE

Separation of $CO_2$/Hydrogen $CO_2$ was separated and recovered from hydrogen by using the system according to the present invention.

As Example 1 where a hydrophilic zeolite membrane for separation and recovery of $CO_2$ according to the present invention was used, a commercially available tubular FAU-type zeolite membrane (NaY-type zeolite membrane, produced by Hitachi Zosen Corporation) was used. The permeation separation capability of the membrane was measured in such a manner that the tubular membrane element was cut into 3 cm and mounted on a stainless steel membrane module, which was then dried by heating to a temperature of 300° C. as the dehydration treatment of the membrane.

A $CO_2$-hydrogen mixed gas was fed to the outside of the tubular zeolite membrane, and the gas permeated through the membrane was measured for the flow rate and the composition, from which the membrane permeabilities of $CO_2$ and hydrogen were calculated. The detailed conditions on the $CO_2$/hydrogen separation are shown below.

Feed gas composition: $CO_2$ (50%)/hydrogen (50%)
Feed gas total pressure (absolute pressure): 4 atm
Feed gas dew point: −20° C. or less
Feed gas flow rate: 600 mL (STP)/min
Permeated side total pressure: atmospheric pressure
Effective membrane area: 10 cm²
(STP: standard temperature and pressure)

In this example, a simulated gas assuming a gas after the dehydration step was used In Comparative Example 1, $CO_2$ was separated and recovered by using an ordinary organic polymer membrane as a membrane for separation and recovery of $CO_2$.

In Comparative Example 2, $CO_2$ was separated and recovered in a wet operation atmosphere by using the same FAU-type zeolite membrane as in Example 1 as a membrane for separation and recovery of $CO_2$, except that the membrane was not dried by heating.

In Comparative Example 3, $CO_2$ was separated and recovered in a dry operation atmosphere by using the same FAU-type zeolite membrane as in Example 1 as a membrane for separation. and recovery of $CO_2$, except that the membrane was not dried by heating.

Figure 2:
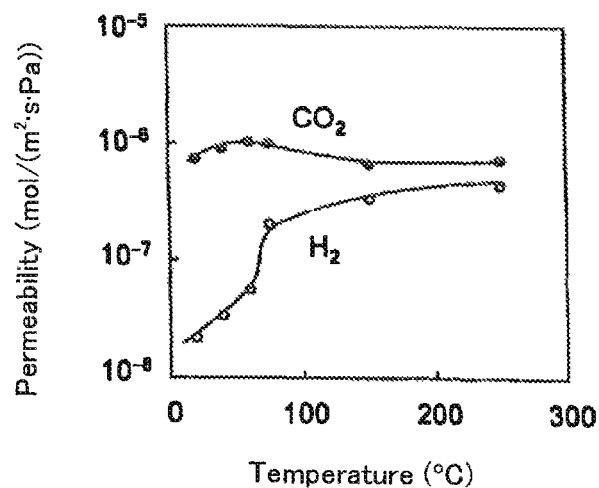
[FIG. 2]
The figure is a graph showing results obtained in separation and recovery of $CO_2$ and hydrogen, which shows the permeabilities of $CO_2$ and $H_2$ with respect to the temperature.
Figure 3:
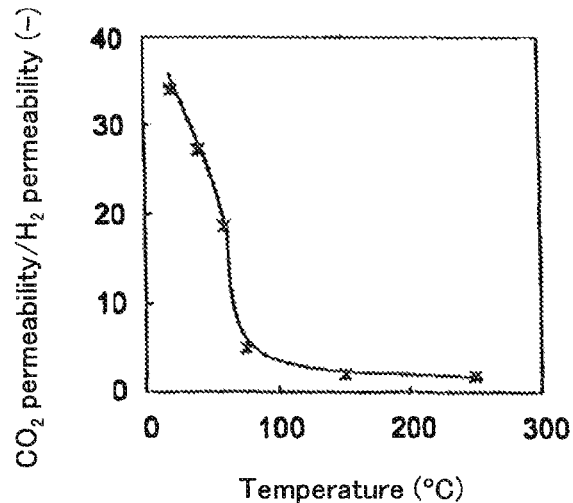
[FIG. 3]
The figure is a graph showing results obtained in separation and recovery of $CO_2$ and hydrogen, which shows the ratio of the permeability of $CO_2$ and the permeability of $H_2$ with respect to the temperature.
Figure 4:
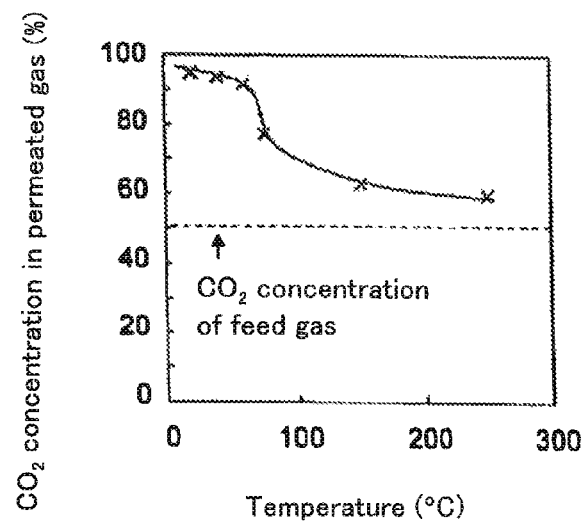
[FIG. 4]
The figure is a graph showing results obtained in separation and recovery of $CO_2$ and hydrogen, which shows the $CO_2$ concentration in the permeated gas with respect to the temperature.
Figure 5:
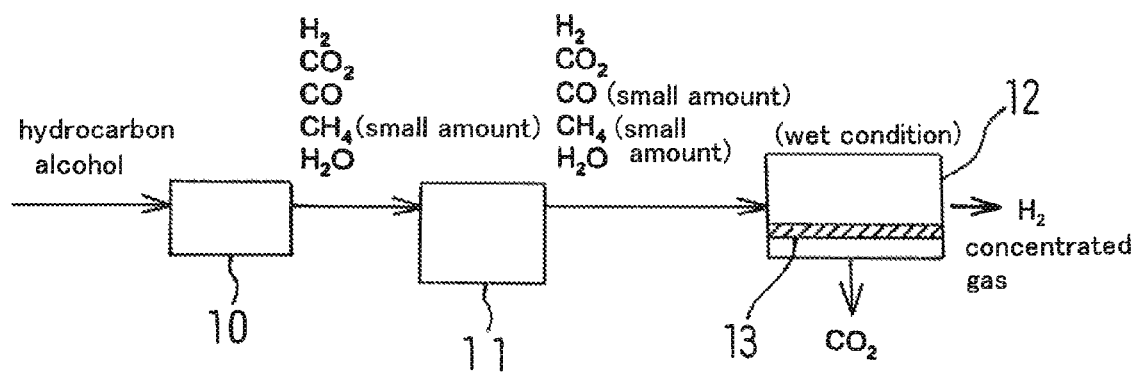
[FIG. 5]
The figure is a flow chart showing an ordinary $CO_2$ membrane separation and recovery system.

The results obtained for the separation and recovery of $CO_2$ and hydrogen are shown in the graphs in FIGS. 2 to 4.

As shown in FIG. 2, the permeability of $CO_2$ became maximum around 60° C., and a considerably large permeability of $10^{-6}$ (mol/(m²·s·Pa)) or more was exhibited.

On the other hand, the hydrogen permeability was lowered under a lower temperature condition, and the ratio of permeabilities of $CO_2$ and hydrogen was increased at a lower temperature as shown in FIG. 3. The $CO_2$ separation selectivity exceeded 10 under an operation condition of 60° C., and $CO_2$ with a concentration of 90% or more was separated and recovered, as shown in FIG. 4.

The comparison in capability between the $CO_2$ membrane separation and recovery system of the present invention and the ordinary membrane separation system is shown in Table 1 below.

TABLE 1

|  | Gas permeability $10^{-8}$ (mol/(m²·s·Pa)) | | Separation selectivity |
|---|---|---|---|
|  | $CO_2$ | $H_2$ | $CO_2/H_2$ |
| Example 1 | 101 | 5 | >10 |
| Comparative Example 1 | 0.2-20 | <1 | >10 |
| Comparative Example 2 | <0.1 | <0.1 | — |
| Comparative Example 3 | <1 | <1 | — |

In Comparative Example 1 using the ordinary organic polymer membrane, the $CO_2$ permeability was as small as from the order of $10^{-9}$ (mol/(m²·s·Pa)) to $2\times10^{-7}$ (mol/(m²·s·Pa)) at most under the condition where the $CO_2/H_2$ separation selectivity exceeded 10, whereas the use of the membrane separation system of the present invention provided a considerably large $CO_2$ permeability of $10^{-6}$ (mol/(m²·s·Pa)) or more even under the condition where the $CO_2/H_2$ separation selectivity of 10 or more was maintained.

It was expected from the results in Comparative Examples 2 and 3 that the features of the present invention, Le., the use of a hydrophilic zeolite membrane having been dehydrated to a $CO_2$ separation membrane, and the $CO_2$ membrane separation step maintained to a dry condition, contributed to the high $CO_2$ permeability and the high $CO_2$ separation selectivity. Separation of $CO_2/CH_4$ The separation and recovery of $CO_2$ were performed in the same manner as above where the feed gas total pressure was 0.4 MPa (absolute pressure) and the feed gas total flow rate was 600 mL (STP)/min.

Separation of $CO_2$, $H_2$, $CH_4$, and CO

The separation and recovery of $CO_2$ were performed in the same manner as above where the feed gas total pressure was 0.4 MPa (absolute pressure) and the feed gas total flow rate was 300 mL (STP)/min.

The feed gas composition was 1/1 with respect to $CO_2$, respectively, and the pressure on the permeate side was atmospheric pressure (absolute pressure: 0.1 MPa).

As a result of the aforementioned experiments, as similar to the case of the separation of $CO_2$/hydrogen, under the operation condition of 60° C. or less, the $CO_2$ permeability was as considerably small as less than $10^{-8}$ (mol/(m²·s·Pa)), and substantially no selectivity was exhibited, in the case under the wet condition and in the case using the non-dried FAU-type zeolite membrane.

In contrast, by making the feed gas dew point of −20° C. or less under the atmospheric pressure and subjecting the membrane to a heat treatment of 150° C. or more for maintaining the dehydrated condition, the $CO_2$ permeability was enhanced to $2\times10^{-7}$ (mol/(m²·s·Pa)) or more, and high selectivities of from 10 to 100 times in terms of permeability ratio were exhibited for the respective kinds of gas including $CH_4$ and CO.

DESCRIPTION OF SYMBOLS

1 $CO_2$ membrane separation module
2 dehydration treatment module

The invention claimed is:

1. A $CO_2$ membrane separation and recovery system comprising a dehydration means preliminary to a $CO_2$ membrane separation means, the $CO_2$ membrane separation means comprising a hydrophilic zeolite membrane formed on a porous substrate, the hydrophilic zeolite membrane formed on the porous substrate being subjected to a dehydration treatment by a heat treatment at from 100 to 800° C., and the hydrophilic zeolite membrane being maintained in a dehydrated condition while in use for $CO_2$ separation and recovery.

2. The $CO_2$ membrane separation and recovery system according to claim 1, wherein the hydrophilic zeolite is an FAU-type or a CHA-type.

3. The $CO_2$ membrane separation and recovery system according to claim 1, which further comprises, subsequent to the dehydration means, a noble metal membrane or a porous molecular sieve membrane constituted by silica or zeolite having an effective pore diameter of from 0.28 to 0.33 nm that allows hydrogen to permeate selectively.

4. A membrane separation and recovery method for $CO_2$ using the $CO_2$ membrane separation and recovery system according to claim 1, comprising a dehydration step preliminary to a $CO_2$ membrane separation step, the $CO_2$ membrane separation step being maintained to a dry condition having a dew point of a feed gas of from −80 to 0° C.

5. The method according to claim 4, wherein $CO_2$ is separated and recovered in a process of producing hydrogen from a hydrocarbon or an alcohol.

6. The method according to claim 5, which comprises a step of performing hydrogen purification.

7. The method according to claim 4, wherein $CO_2$ is separated and recovered from a mixed gas containing $CO_2$.

8. The method according to claim 7, wherein the mixed gas is a natural gas or a biogas that contains methane gas as a major component and steam.

9. A membrane separation and recovery method for $CO_2$ using the $CO_2$ membrane separation and recovery system according to claim 2, comprising a dehydration step preliminary to a $CO_2$ membrane separation step, the $CO_2$ membrane separation step being maintained to a dry condition having a dew point of a feed gas of from −80 to 0° C.

10. A membrane separation and recovery method for $CO_2$ using the $CO_2$ membrane separation and recovery system according to claim 3, comprising a dehydration step preliminary to a $CO_2$ membrane separation step, the $CO_2$ membrane separation step being maintained to a dry condition having a dew point of a feed gas of from −80 to 0° C.

11. The method according to claim 9, wherein $CO_2$ is separated and recovered in a process of producing hydrogen from a hydrocarbon or an alcohol.

12. The method according to claim 10, wherein $CO_2$ is separated and recovered in a process of producing hydrogen from a hydrocarbon or an alcohol.

13. The method according to claim 11, which comprises a step of performing hydrogen purification.

14. The method according to claim 12, which comprises a step of performing hydrogen purification.

15. The method according to claim 9, wherein $CO_2$ is separated and recovered from a mixed gas containing $CO_2$.

16. The method according to claim 10, wherein $CO_2$ is separated and recovered from a mixed gas containing $CO_2$.

17. The method according to claim 15, wherein the mixed gas is a natural gas or a biogas that contains methane gas as a major component and steam.

18. The method according to claim 16, wherein the mixed gas is a natural gas or a biogas that contains methane gas as a major component and steam.

\* \* \* \* \*